(12) United States Patent
Zeng et al.

(10) Patent No.: US 10,965,856 B1
(45) Date of Patent: Mar. 30, 2021

(54) CAMERA VISION SYSTEMS

(71) Applicant: GM GLOBAL TECHNOLOGY OPERATIONS LLC, Detroit, MI (US)

(72) Inventors: Wei Zeng, Oakland Township, MI (US); Shuqing Zeng, Sterling Heights, MI (US); Scott E. Parrish, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/711,760

(22) Filed: Dec. 12, 2019

(51) Int. Cl.
*H04N 5/225* (2006.01)
*G03B 29/00* (2021.01)
*B60R 11/04* (2006.01)

(52) U.S. Cl.
CPC .......... *H04N 5/2257* (2013.01); *G03B 29/00* (2013.01); *H04N 5/2254* (2013.01); *B60R 11/04* (2013.01)

(58) Field of Classification Search
None
See application file for complete search history.

(56) References Cited

U.S. PATENT DOCUMENTS

| 10,638,030 B1* | 4/2020 | Sinharoy | H04N 13/207 |
| 2016/0280397 A1* | 9/2016 | Christ | G06T 5/005 |
| 2018/0266828 A1* | 9/2018 | Best | G01C 21/28 |

* cited by examiner

*Primary Examiner* — Lindsay J Uhl
(74) *Attorney, Agent, or Firm* — Lorenz & Kopf, LLP

(57) ABSTRACT

In various embodiments, cameras and mobile platforms are provided. In one exemplary embodiment, a mobile platform is provided that includes a body and a camera disposed on the body. The camera includes one or more image sensors, and one or more lens assemblies. The one or more lens assemblies are configured with respect to the one or more image sensors, that at least one image plane from the one or more image sensors is tilted to form a non-zero angle with at least one equivalent lens plane from the one or more lens assemblies, transferring the image focal plane to be parallel to the movement direction of the mobile platform in which the camera is installed. The use of multiple image sensors or lens assemblies in certain embodiments increases camera angle of view.

19 Claims, 14 Drawing Sheets

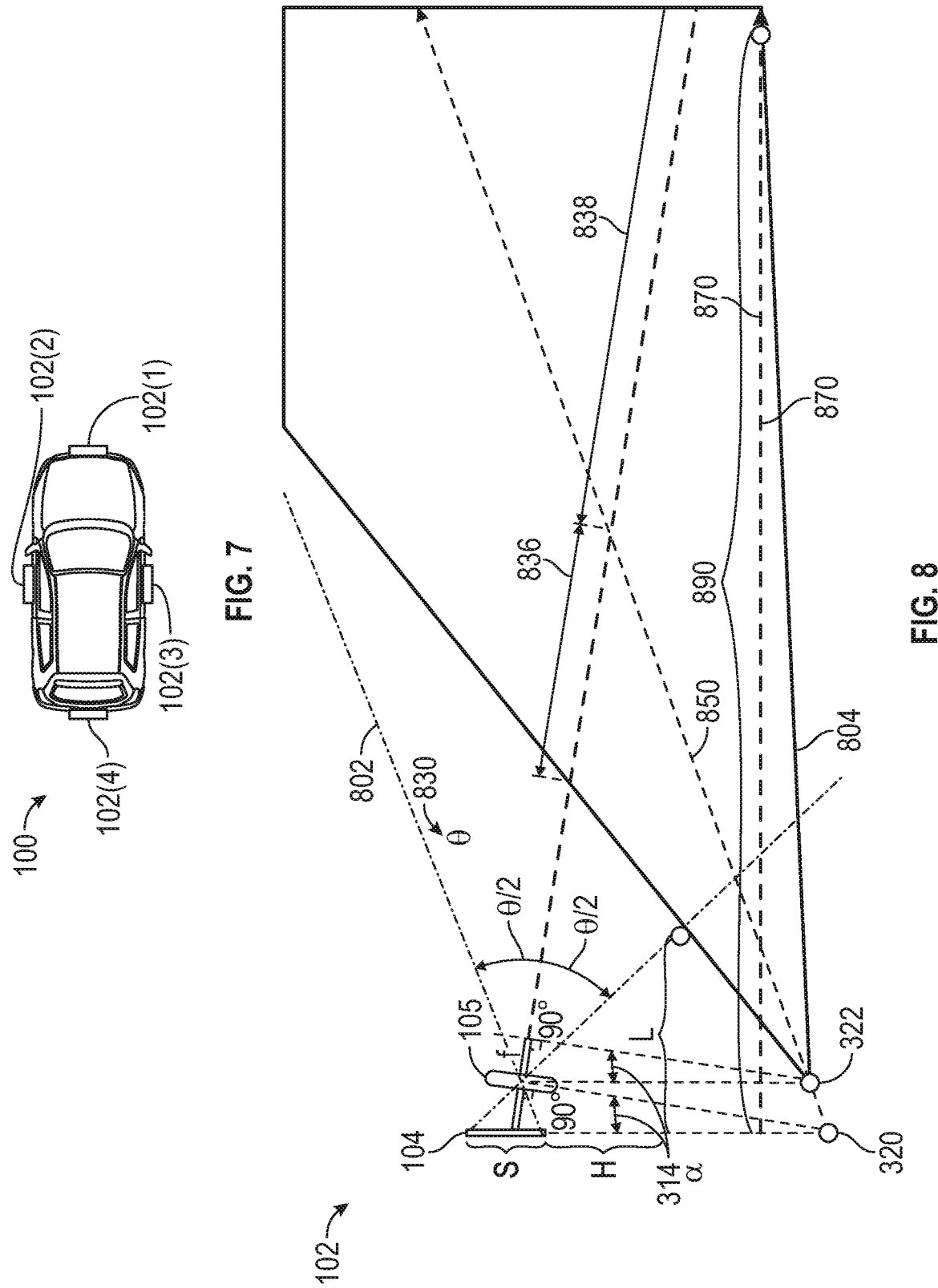

CAMERA VISION SYSTEMS

TECHNICAL FIELD

The technical field generally relates to the field of mobile platforms and vehicles and, more specifically, to vehicle (or mobile platform) camera vision systems.

BACKGROUND

Certain vehicles include one or more vehicle cameras that provide information for a driver of the vehicle or for one or more vehicle systems, such as autonomous driving and active safety systems. Such vehicle cameras may have a limited depth of field, such that objects outside the depth of field may appear somewhat blurry as compared with objects inside the depth of field.

Accordingly, it is desirable to provide camera vision systems for vehicles, including with an improved depth of field. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a camera is provided that is configured for installation in a mobile platform. The camera includes one or more image sensors; and one or more lens assemblies configured with respect to the one or more image sensors, that at least one image plane from the one or more image sensors is tilted to form a non-zero angle with at least one equivalent lens plane from the one or more lens assemblies, transferring an image sensor focal plane to be parallel to the direction of movement for the mobile platform in which the camera is installed, providing a theoretically infinite depth of field for the image sensor.

Also in one embodiment, the camera includes one or more focal planes; and at least one focal plane makes a non-zero angle with respect to the image plane.

Also in one embodiment, the focal plane intersects both the image plane and a lens plane at a single point.

Also in one embodiment, the focal plane is aligned to be parallel to the horizontal direction of movement of the mobile platform.

Also in one embodiment, the focal plane is parallel to an edge plane of the field of view.

Also in one embodiment, the focal plane extends horizontally a theoretically infinite distance from the vehicle in the horizontal direction of movement of the vehicle.

Also in one embodiment, the one or more image sensors include a single image sensor; and the one or more lens assemblies include a single lens assembly.

Also in one embodiment, the one or more image sensors include: a first image sensor having a first image plane; and a second image sensor having a second image plane; the one or more lens assemblies including a single lens assembly; the lens plane forms a non-zero angle with both the first image plane and the second image plane, and the use of multiple image sensors, namely, the first and second image sensors, increases the camera angle of view as compared with using a single image sensor.

Also in one embodiment, the camera further includes a mirror disposed to separate the second image sensor and the first image sensor.

Also in one embodiment, the one or more image sensors include a single image sensor; the one or more lens assemblies includes: a first lens assembly having a first lens plane; and a second lens assembly having a second lens plane; each of the first lens plane and the second lens plane forms a non-zero angle with the image plane; and the use of multiple lens assemblies, namely, the first and second lens assemblies, increases the camera angle of view as compared with using a single lens assembly.

Also in one embodiment, the camera further includes an image separator extending from the image sensor between the first lens and the second lens.

In another exemplary embodiment, a mobile platform is provided that includes a body and a camera disposed on the body. The camera includes one or more image sensors, and one or more lens assemblies. The one or more lens assemblies are configured with respect to the one or more image sensors, that at least one image plane from the one or more image sensors is tilted to form a non-zero angle with at least one equivalent lens plane from the one or more lens assemblies, resulting in a field of view that is aligned parallel to a horizontal direction of movement of the mobile platform in which the camera is installed.

Also in one embodiment, the camera includes a focal plane; and the focal plane makes a non-zero angle with respect to the image plane.

Also in one embodiment, the focal plane intersects both the image plane and the lens plane at a single point.

Also in one embodiment, the focal plane is aligned to be parallel to the horizontal direction of movement of the mobile platform.

Also in one embodiment, the focal plane is parallel to an edge plane of the field of view.

Also in one embodiment, the one or more image sensors include a single image sensor; and the one or more lens assemblies include a single lens.

Also in one embodiment, wherein the one or more image sensors include: a first image sensor having a first image plane; and a second image sensor having a second image plane; the one or more lens assemblies include a single lens assembly; the lens plane forms a non-zero angle with both the first image plane and the second image plane; the camera further includes a mirror disposed to separate the second image sensor and the first image sensor; and the use of multiple image sensors, namely, the first and second image sensors, increases the camera angle of view as compared with using a single image sensor.

Also in one embodiment, the one or more image sensors include a single image sensor; the one or more lens assemblies includes: a first lens assembly having a first lens plane; and a second lens assembly having a second lens plane; and each of the first lens plane and the second lens plane forms a non-zero angle with the image plane; the camera further includes an image separator extending from the image sensor between the first lens and the second lens; and the use of multiple lens assemblies, namely, the first and second lens assemblies, increases the camera angle of view as compared with using a single lens assembly.

In another exemplary embodiment, a mobile platform is provided that includes a body and a camera. The camera is disposed on the body, and includes one or more image sensors and one or more lens assemblies. The one or more lens assemblies are configured with respect to the one or more image sensors, that at least one image plane from the one or more image sensors is tilted to form a non-zero angle with at least one equivalent lens plane from the one or more lens assemblies, resulting in a field of view that is aligned parallel to a horizontal direction of movement of the vehicle in which the camera is installed; wherein: the camera includes a focal plane; the focal plane makes a non-zero angle with respect to the image plane; the focal plane intersects both the image plane and a lens plane at a single point; and the focal plane is aligned to be parallel to the horizontal direction of movement of the vehicle.

DESCRIPTION OF THE DRAWINGS

The present disclosure will hereinafter be described in conjunction with the following drawing figures, wherein like numerals denote like elements, and wherein:

FIGS. 7-18 are schematic diagrams of different exemplary vehicle applications of the cameras of FIGS. 1-6 and the vehicle of FIG. 1, in accordance with various exemplary embodiments.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
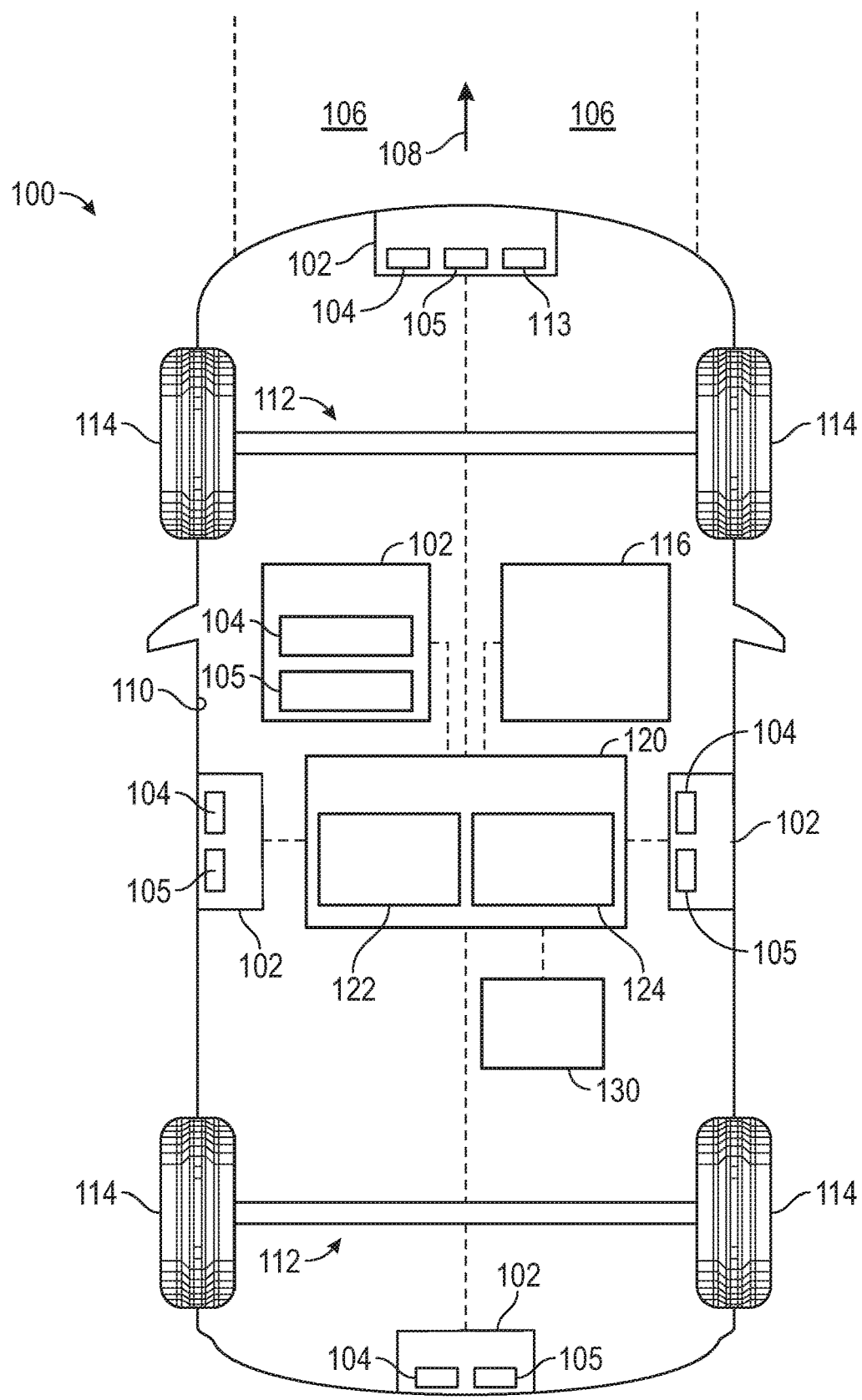
FIG. 1 is a functional block diagram of a vehicle that includes one or more cameras with a field of view that is parallel to a horizontal plane for movement of the vehicle, in accordance with an exemplary embodiment.

FIG. 1 illustrates a vehicle 100, according to an exemplary embodiment. As described in greater detail further below, the vehicle 100 includes one or more camera systems 102 mounted on the vehicle 100. As depicted in FIG. 1, in various embodiments, each camera system 102 includes one or more respective sensors 104 and lenses (or lens assemblies) 105 (each having a respective equivalent lens plane) (and, in certain embodiments, one or more mirrors 113) that are aligned in a particular manner to provide a focal plane (plane of sharpest focus) 106 that is parallel to the direction 108 of movement for the vehicle 100, as described further below in greater detail in connection with FIGS. 2-18. As used throughout this Application, it will be appreciated that a lens assembly includes, in certain embodiments, one or more optical lenses and filters.

In certain embodiments, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle, an airplane, a marine vehicle, and/or one or more other types of vehicles. In addition, in various embodiments, it will also be appreciated that the vehicle 100 may comprise any number of other types of mobile platforms.

In the depicted embodiment, the vehicle 100 includes a body that substantially encloses other components of the vehicle 100. Also in the depicted embodiment, the vehicle 100 includes a plurality of axles 112 and wheels 114. The wheels 114 are each rotationally coupled to one or more of the axles 112 near a respective corner of the body 110 to facilitate movement of the vehicle 100. In one embodiment, the vehicle 100 includes four wheels 114, although this may vary in other embodiments (for example for trucks and certain other vehicles).

A drive system 116 drives the wheels 114. The drive system 116 preferably comprises a propulsion system. In certain exemplary embodiments, the drive system 116 comprises an internal combustion engine and/or an electric motor/generator, coupled with or without a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, in various embodiments the camera(s) 102 may be disposed in various locations on or against the body 110 of the vehicle 100. For example, in certain embodiments, cameras 102 are disposed on a front portion of the vehicle 100 (e.g., behind and/or against a front windshield of the vehicle 100), on the sides (e.g., driver side and passenger side) of the vehicle 100, on a rear portion of the vehicle 100 (e.g., on or proximate a trunk or rear hatch), on a roof of the vehicle, and/or inside cabin behind windshield, among other various possible locations.

Also in depicted in FIG. 1, in various embodiments, each of the cameras 102 is coupled to a control system 120 of the vehicle 100. In various embodiments, the control system 120 is also coupled to the drive system 116 and various other systems 130 of the vehicle 100 (e.g., steering, braking, acceleration, and/or one or more other active safety, autonomous driving, providing a rear camera mirror for unobstructed vision, and/or other systems and/or associated functionality for the vehicle 100). In various embodiments, the control system includes a computer processor 122 and a signal bearing computer memory 124. In addition, in various embodiments, the control system 120 of FIG. 1 (including the processor 122 thereof) controls various vehicle functionality (e.g., e.g. lane keep assist, lane keep awareness, automatic braking, adaptive cruise control, forward collision alert, and/or various other safety and/or other features for the vehicle 100) using images obtained from the cameras 102 (e.g., automatic braking based on detected pedestrians, vehicles, and/or other objects, and/or various other functions based on the roadway, markings thereof, and/or objects thereon as captured via the camera images).

Figure 2:
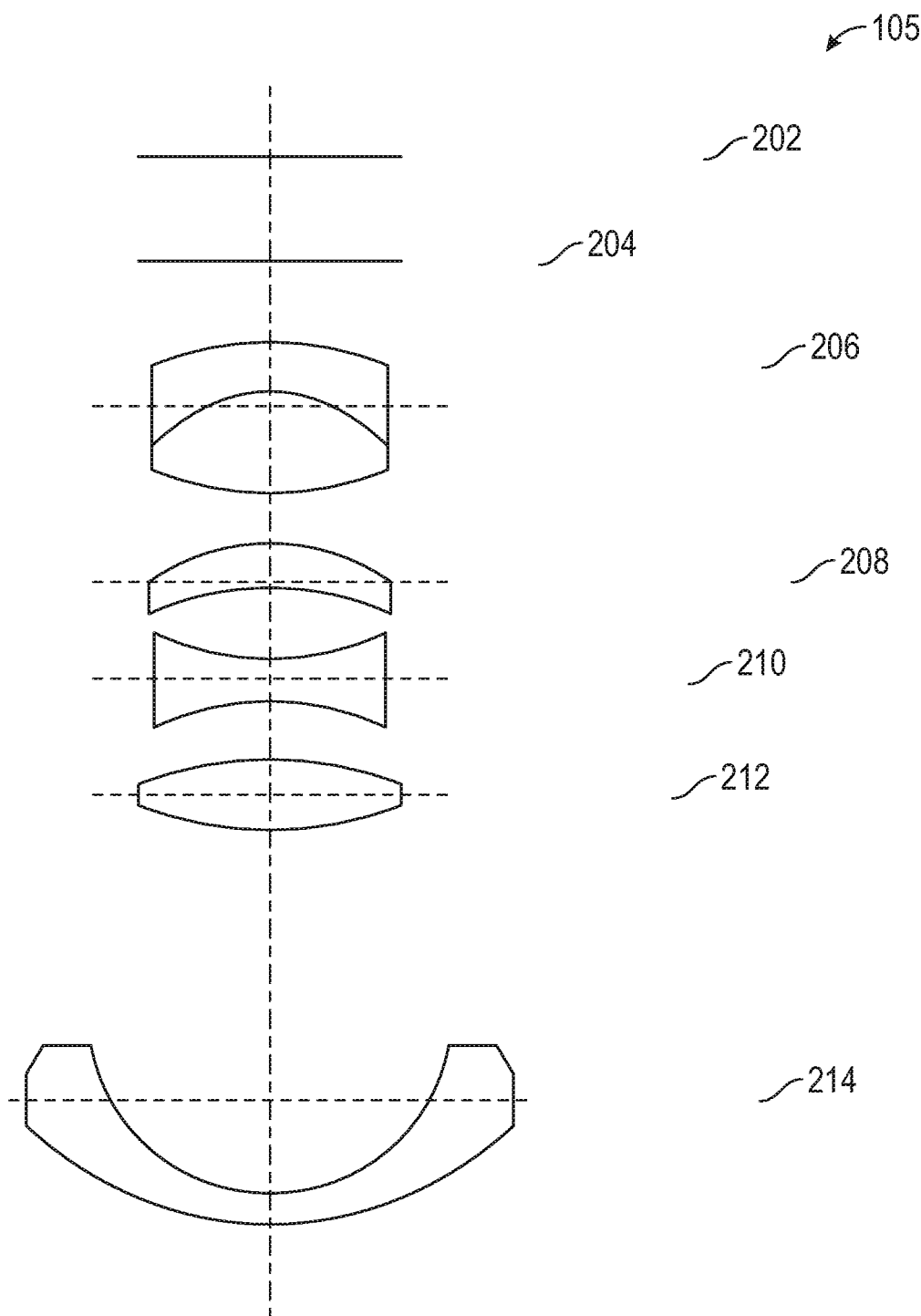
FIG. 2 is a schematic illustration of an exemplary lens assembly of one of the cameras of FIG. 1, in accordance with an exemplary embodiment.

With reference to FIG. 2, a schematic illustration is provided for an exemplary lens assembly 105 of one of the cameras 102 of FIG. 1, in accordance with an exemplary embodiment. As depicted in FIG. 2, in certain embodiments, the lens assembly 105 includes a sensor protector 202, a filter 204, a combination lens 206 (e.g., comprising a convex-concave and biconvex lens cemented together), a convex meniscus lens 208, a biconcave lens 210, a biconvex lens 212, and a meniscus lens 214. In various embodiments, the components of the lens assembly 105 may vary (and may also comprise a single lens in certain embodiments). Unless otherwise noted, the terms lens 105 and lens assembly 105 as used herein are referred to interchangeably, as representing a single lens 105 and/or a lens assembly 105 including one or more of the existing lens and filter components.

FIGS. 3-6 are schematic diagrams of different exemplary cameras of FIG. 1, in accordance with various exemplary embodiments.

Figure 3:
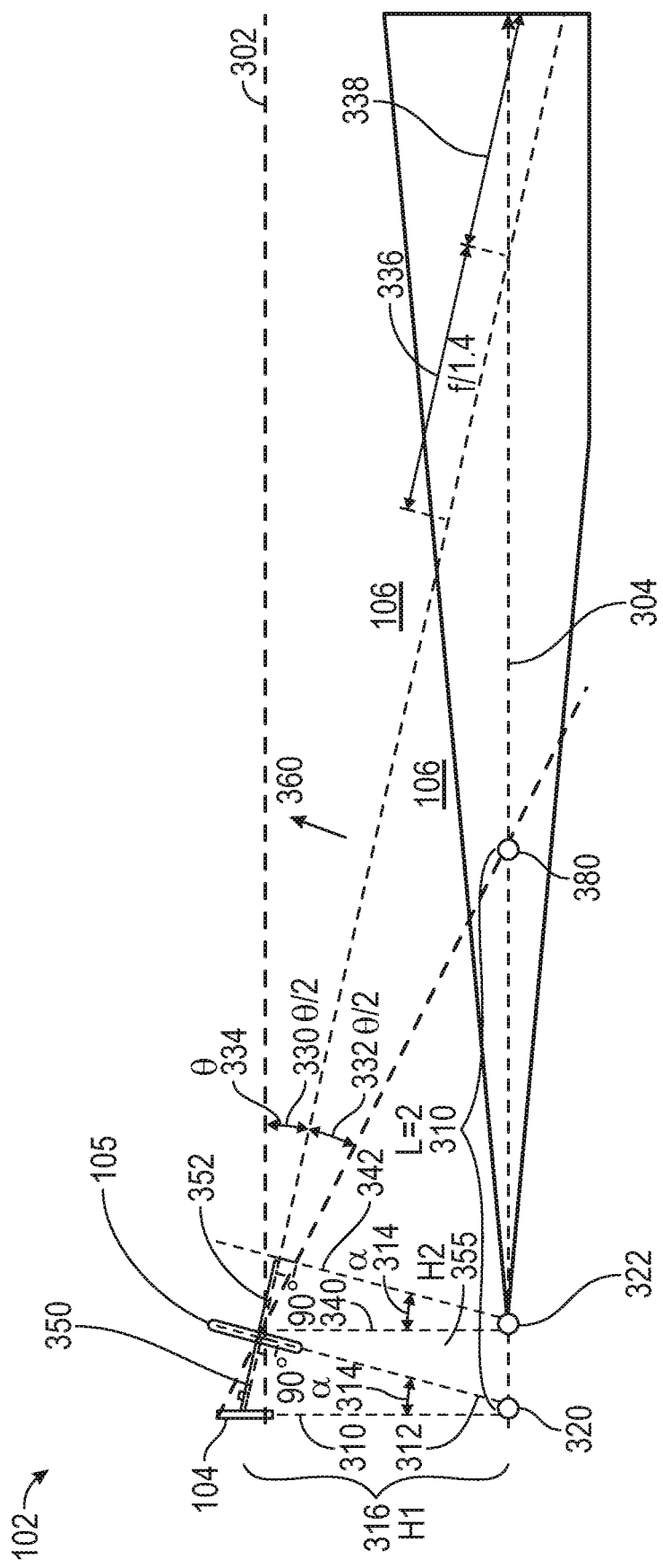
FIGS. 3-6 are schematic diagrams of different exemplary cameras of FIG. 1, in accordance with various exemplary embodiments.

First, with reference to FIG. 3, a schematic diagram is provided for an exemplary camera 102 of the vehicle 100 of FIG. 1, in accordance with an exemplary embodiment. As depicted in FIG. 3, in various embodiments, the sensor 104 and lens (or lens assembly) 105 of the camera are positioned with respect to one another such that the depth of field 106 represents a horizontal depth of field that is parallel to the horizontal direction of 108 of movement of the vehicle 100 of FIG. 1. As shown in FIG. 3, in certain embodiments, the field of view 106 is bounded at least in part by a first plane 302 and a second plane 304. In certain embodiments, the first plane 302 corresponds to the plane of movement (or travel) of the vehicle 100 in the horizontal direction 108 of FIG. 1. Also in certain embodiments, the second plane 304 corresponds to a focal plane (i.e., a plane of sharp focus) for the camera 102.

Specifically, as shown in FIG. 3, the lens (or lens assembly) 105 is angled with respect to the sensor 104 such that the image plane 310 and the lens plane 312 intersect with one another and the focal plane 304 at intersection point 320, and forming an angle α (314) with respect thereto. Accordingly, in contrast to a typical assembly, the focal plane 304 is not parallel to the image plane 312 and the lens plane 312, but rather intersects with both at point 320. In various embodiments, the image plane 310 from the sensor 104 is tilted to form the angle α (314) with at least one equivalent lens plane 312 from the lens assembly 105. In various embodiments, the angle α (314) is a non-zero angle that is between zero and ninety degrees.

Also as depicted in FIG. 3, in various embodiments, the focal plane 304, the parallel-to-image plane 340, and the front-local-plane 342 each intersect at point 322 of FIG. 3. In addition, as depicted in FIG. 2, the parallel-to-image plane 340 is parallel to the image plane 310 across the center of the lens 105. Moreover, also as depicted in FIG. 3, the front-local-plane 342 is parallel to the lens plane 312, and the distance (f) 352 between the lens plane 312 and the front-local-plane 342 is equal to the focal length of the lens 105.

Also as depicted in FIG. 3, in various embodiments, the focal plane 304 is aligned to be parallel to the vehicle horizontal plane (e.g., the first plane 302 as depicted in FIG. 3). Also in various embodiments, as depicted in FIG. 3, (i) a first height (H1) 316 represents a height of the sensor 104 from the focal plane 304; (ii) a second height (H2) 355 represents a height of the lens 105 from the focal plane 304; (iii) a first distance ($D_i$) 350 represents an image distance; (iv) a second distance ($D_o$) 360 represents an object distance; (v) a first angle (θ/2) 330 represents a first field of view angle; (vi) a second angle (θ/2) 332 represents a second field of view angle; (viii) a third angle (θ) 334 represents a combined field of view angle (combining both the first and second angles 330 and 332; and (ix) the field of view 106 includes both a front depth of field 336 and a rear depth of field 338 that determines the sharp image region for an infinite distance in the direction of movement of the vehicle. In one embodiment, the focal plane 304 is also parallel to the edge plane of the field of view 302.

Also in accordance with the embodiment of FIG. 3, the sensor 104 and lens 105 are positioned together with respect to the angle α (314) such that the resulting horizontal depth of field 106 is attained, and such that the camera sensor 104 and lens 105 optical layout design transfers the object plane on which the camera 102 is focused to align with the vehicle horizontal plane to render sharp images with a theoretically infinite distance in front of the camera 102, without diminishing aperture. In various embodiments, this is based on the interrelationships of the parameters of FIG. 3 as set forth below, namely:

$$\sin(\alpha) = D_i/H1 \quad \text{(Equation 1)}$$

(based on the Scheimpflug principle);

$$\sin(\alpha) = f/H2 \quad \text{(Equation 2)}$$

(based on the Hinge rule);

$$1/f = 1/D_i + 1/D_o \quad \text{(Equation 3)}$$

(based on the Gaussian optic equation);

$$H1/(Di+Do) = H2/Do \quad \text{(Equation 4)}$$

(based on the focal plane being aligned with the main light illumination direction); and $$\theta = 2 \cdot \tan^{-1}(S'/2 \cdot f) \quad \text{(Equation 5)}$$

(based on the camera angle of view equation).

Also in the embodiment of FIG. 3, the third angle (θ) 334 (also referred to as the vertical angle of view (AOV)) covers near the view point 380 (e.g., distance "L" 370 of FIG. 3 being less than two meters, in certain embodiments) through determining image size according to the camera angle of view equations (above). In addition, also in the embodiment of FIG. 3, the focal plane 304 (or plane of sharp focus) is parallel to the first plane 302 (which also may be referred to as the top edge of the vertical AOV, obtained through determining image distance $D_i$ 350 according to the equations above, in order to ensure the largest vertical angel of view (AOV).

Figure 4:
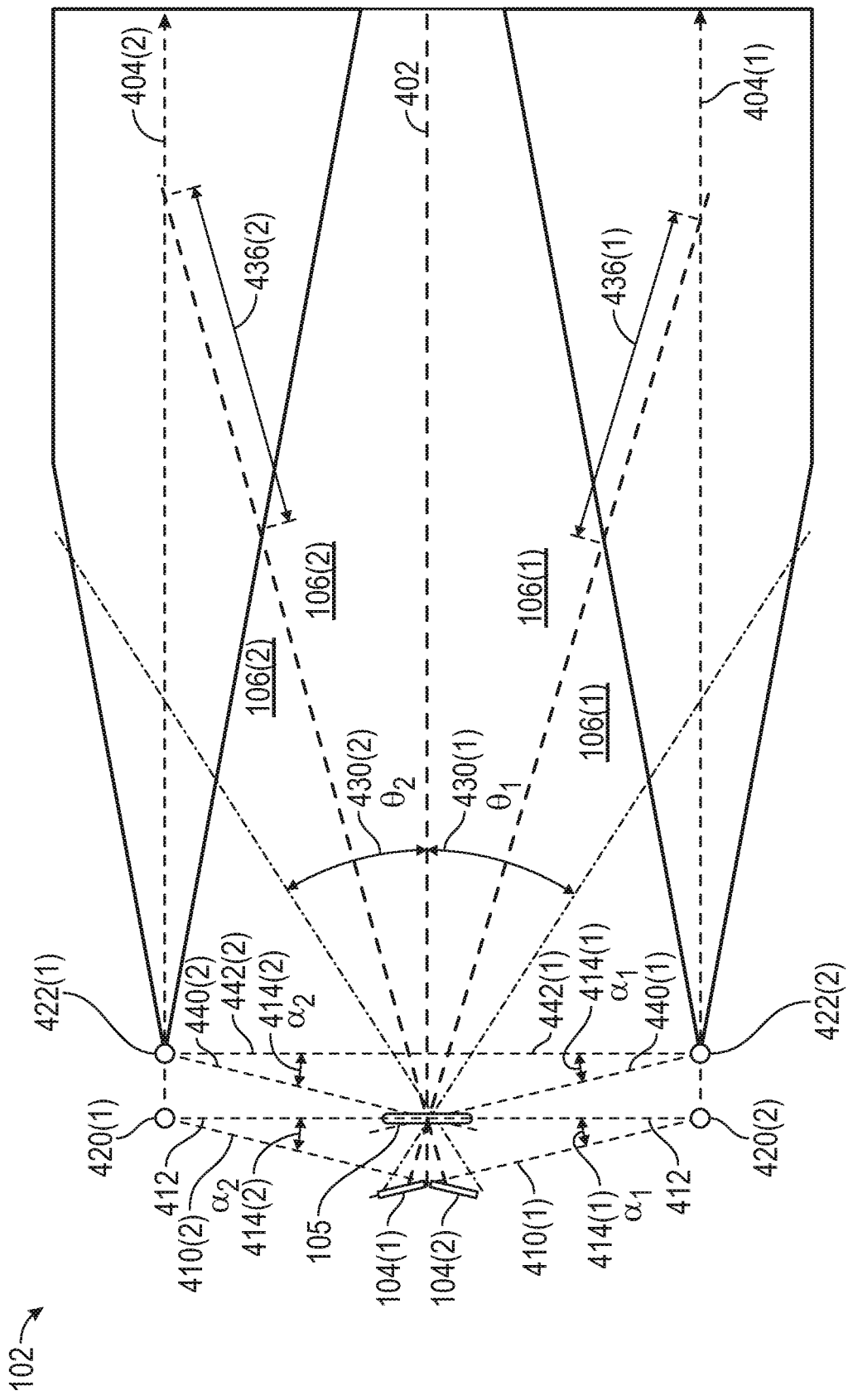

With reference to FIG. 4, a schematic diagram is provided for another exemplary camera 102 of the vehicle 100 of FIG. 1, in accordance with an exemplary embodiment. In addition to render sharp images with a theoretically infinite distance in front of the camera 102 (as depicted in FIG. 3), the exemplary camera depicted in FIG. 4 provides a significantly increased camera field of view to handle road topography changes. As depicted in FIG. 4, in various embodiments, there are two camera image sensors 104, namely a first sensor 104(1) and a second sensor 104(2). As shown in FIG. 4, the two sensors 104(1) and 104(2) are placed symmetrical to one another, with the first plane 402 being in the center. In the depicted embodiment, the first sensor 104(1) defines the camera angle of view below the first plane 402, and the second sensor 104(2) defines the camera angle of view above the first plane 402. Also in the depicted embodiment, the two sensors 104(1) and 104(2) are utilized with the same lens (or lens assembly) 105.

Also as shown in FIG. 4, in the depicted embodiment, the first image plane 410(1) of the first sensor 104(1) and the lens plane 412 intersect with one another and a first focal plane 404(1) at intersection point 420(1), and form an angle $\alpha_1$ 414(1) with respect thereto. Similarly, the second image plane 410(2) of the second sensor 104(2) and the lens plane 412 intersect with one another and a second focal plane 404(2) at intersection point 420(2), and form an angle $\alpha_2$ 414(2) with respect thereto. In various embodiments, angle $\alpha_1$ 414(1) and $\alpha_2$ 414(2) are a non-zero angle that is between zero and forty-five degrees.

Also as depicted in FIG. 4, in various embodiments, the first focal plane 404(1), the parallel-to-image plane 440(1), and the front-local-plane 442(1) with respect to the first sensor 104(1) each intersect at point 422(1) of FIG. 4. Similarly, also in various embodiments, the second focal plane 404(2), the parallel-to-image plane 440(2), and the front-local-plane 442(2) with respect to the second sensor 104(2) each intersect at point 422(2) of FIG. 4.

Also as shown in FIG. 4, in the depicted embodiment, the first sensor 104(1), in combination with the lens 105, generate first angles $\theta_1$ 430(1) for a first depth of field 106(1) (and focal plane 404(1)) on a lower half of the horizontal direction of movement of the vehicle 100, including a first front depth of field 436(1), and between the first plane 402 and a first focal plane (plane of sharpest focus) 404(1). Similarly, also as shown in FIG. 4, also in the depicted embodiment, the second sensor 104(2), in combination with the lens 105, generate second angles $\theta_2$ 430(2) for a second depth of field 106(2) (and focal plane 404(1)) on an upper half of the direction of movement of the vehicle 100, including a second front depth of field 436(2), and between the first plane 402 and a second focal plane (plane of sharpest focus) 404(2). In various embodiments, angles $\theta_1$ 430(1) and $\theta_2$ 430(2) are non-zero angles that are each between zero and eighty degrees.

Figure 5:
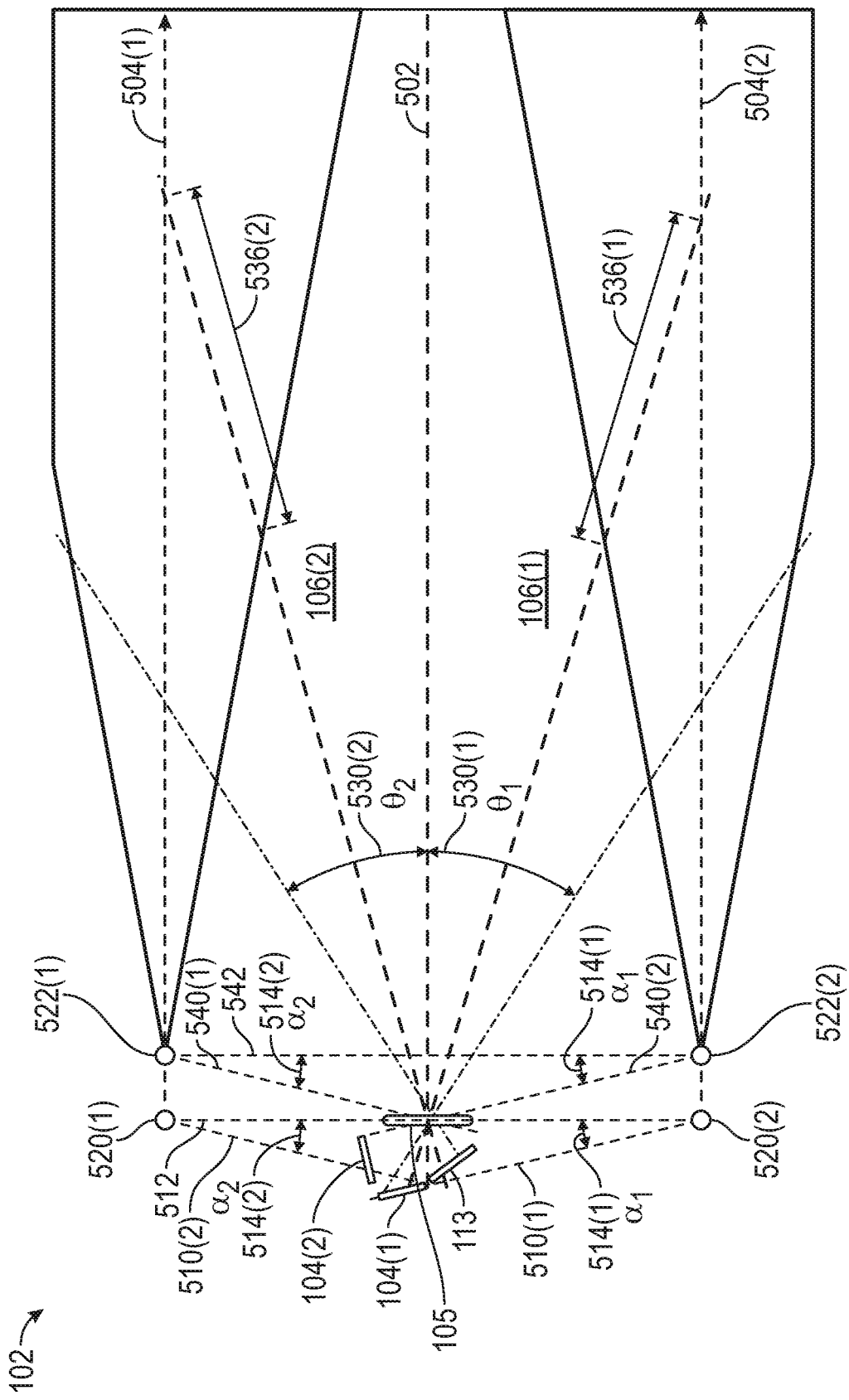

With reference to FIG. 5, a schematic diagram is provided for another exemplary camera 102 of the vehicle 100 of FIG. 1, in accordance with an exemplary embodiment. In addition to render sharp images with a theoretically infinite distance in front of the camera 102 (as depicted in FIG. 3), the exemplary camera depicted in FIG. 5 is another method to provide a significantly increased camera field of view to handle road topography changes. As depicted in FIG. 5, in various embodiments, there is a mirror 113 in addition to the lens 105 and two sensors 104 (namely, a first sensor 104(1) and a second sensor 104(2)), with the mirror 113 disposed to separate the two image sensors 104(2) and 104(1). As shown in FIG. 5, the mirror 113 is added to have a forty-five-degree angle with respect to the lens 105, reflecting the view from one of the sensors 104. Accordingly, the sensors 104(1) and 104(2) are apart from one another, eliminating the gap between angles $\theta_1$ 530(1) and $\theta_2$ 530(2).

As shown in FIG. 5, the first image plane 510(1) of the first sensor 104(1) and the lens plane 512 intersect with one another and a first focal plane 504(1) at intersection point 520(1), and form an angle $\alpha_1$ 514(1) with respect thereto. Similarly, the second image plane 510(2) of the second sensor 104(2) and the lens plane 512 intersect with one another and a second focal plane 504(2) at intersection point 520(2), and form an angle $\alpha_2$ 514(2) with respect thereto.

Also as depicted in FIG. 5, the first focal plane 504(1), the parallel-to-image plane 540(1) for the first sensor 104(1), and the front-local-plane 542 each intersect at point 522(1) of FIG. 5. Similarly, also in various embodiments, the second focal plane 504(2), the parallel-to-image plane 540(2) for the second sensor 104(2), and the front-local-plane 542 each intersect at point 522(2) of FIG. 5.

Also as shown in FIG. 5, in the depicted embodiment, the first sensor 104(1), in combination with the lens 105, generate first angles $\theta_1$ 530(1) for a first depth of field 106(1) (and focal plane 504(1)) on a lower half of the horizontal direction of movement of the vehicle 100, including a first front depth of field 536(1), and between the first plane 502 and a first focal plane (plane of sharpest focus) 504(1). Similarly, also as shown in FIG. 5, also in the depicted embodiment, the second sensor 104(2), in combination with the mirror 113 and the lens 105, generate second angles $\theta_2$ 530(2) for a second depth of field 106(2) (and focal plane 504(2)) on an upper half of the direction of movement of the vehicle 100, including a second front depth of field 536(2), and between the first plane 502 and a second focal plane (plane of sharpest focus) 504(2). In various embodiments, angles $\theta_1$ 530(1) and $\theta_2$ 530(2) are non-zero angles that are each between zero and eighty degrees.

Figure 6:
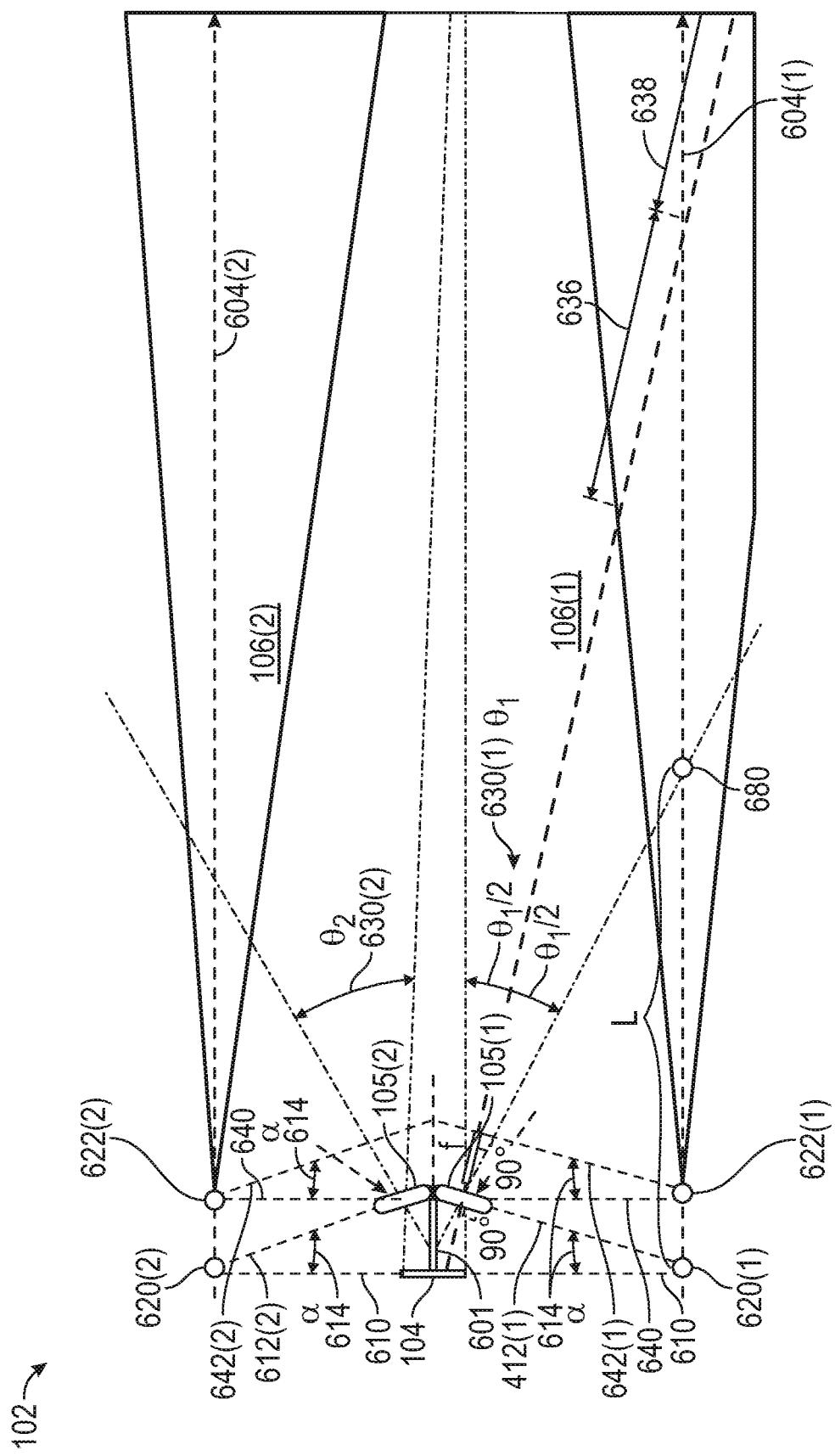

With reference to FIG. 6, a schematic diagram is provided for another exemplary camera 102 of the vehicle 100 of FIG. 1, in accordance with an exemplary embodiment. In addition to render sharp images with a theoretically infinite distance in front of the camera 102 (as depicted in FIG. 3), the exemplary camera depicted in FIG. 6 is another method to provide a significantly increased camera field of view to handle road topography changes. As depicted in FIG. 6, in various embodiments, two lenses (or lens assembly) 105 are utilized, namely a first lens (or lens assembly) 105(1) and a second lens (or lens assembly) 105(2), in conjunction with a single camera image sensor 104. In certain embodiments, the second lens 105(2) comprises a wide angled lens (or lens assembly), which increases the camera vertical AOV. In addition, an image separator 601 is utilized in order to avoid crosstalk or interference between the two lenses 105(1) and 105(2). In various embodiments, the image separator 601 extends from the sensor between the first lens and the second lens.

As shown in FIG. 6, the image plane 610 intersects with a first lens plane 612(1) of the first lens 105(1) and a first focal plane 604(1) at intersection point 620(1), and form an angle $\alpha_1$ 614 with respect thereto. Similarly, the image plane 610 intersects with a second lens plane 612(2) of the second lens 105(2) and a second focal plane 604(2) at intersection point 620(2), and form an angle $\alpha_2$ 614 with respect thereto.

Also as depicted in FIG. 6, the first focal plane 604(1), the parallel-to-image plane 640, and a first front-local-plane 642(1) with respect to the first lens 105(1) each intersect at point 522(1) of FIG. 6. Similarly, also in various embodiments, the second focal plane 604(2), the parallel-to-image plane 640, and a second front-local-plane 642(2) with respect to the second lens 105(2) each intersect at point 522(2) of FIG. 6.

Also as shown in FIG. 6, in the depicted embodiment, the sensor 104, in combination with the first lens 105 (1), generate first angles $\theta_1$ 630(1) for a first depth of field 106(1) (and focal plane 604(1)) on a lower half of the horizontal direction of movement of the vehicle 100, including a front depth of field 636 and a back depth of field 638, and above a first focal plane (plane of sharpest focus) 604(1), following a near view point 680 as shown in FIG. 6. Similarly, also as shown in FIG. 6, also in the depicted embodiment, the sensor 104, in combination with the second lens 105 (2), generate second angles $\theta_2$ 630(2) for a second depth of field 106(2) (and focal plane 604(2)) on an upper half of the horizontal direction of movement of the vehicle 100, including below a second focal plane (plane of sharpest focus) 604(2). In various embodiments, angles $\theta_1$ 630(1) and $\theta_2$ 630(2) are non-zero angles that are each between zero and eighty degrees.

FIGS. 7-18 are schematic diagrams of different exemplary vehicle applications of the cameras of FIGS. 1-6 and the vehicle of FIG. 1, in accordance with various exemplary embodiments.

First, with respect to FIG. 7, a first vehicle application is provided for a surrounding vision system, in accordance with an exemplary embodiment. In one embodiment, the vehicle application of FIG. 7 is utilized in connection with a parking assist functionality for the vehicle 100 of FIG. 1.

As shown in FIG. 7, in the depicted embodiment, cameras 102 are arranged surrounding the vehicle, including cameras mounted on front-side 102(1), driver-side 102(2), passenger-side 102(3), and rear-side 102(4). The application of FIG. 7 is described in greater detail below in connection with an exemplary implementation in FIG. 8 below.

Specifically, with reference to FIG. 8, a configuration for a camera 102 for the surrounding vision system of FIG. 7 is provided, in accordance with an exemplary embodiment. In the embodiment of FIG. 8, the same sensor 104 and lens 105 assembly is provided as described above in connection with FIG. 3, and including the same angle α 314. In one such embodiment, a wide-angle lens (e.g., a fisheye lens) is utilized for the lens assembly 105.

In the embodiment of FIG. 8, the lens plane is angled to intersect with the camera image sensor plane and face towards the road surface. Due to this, and the geometry of the cameras 102 with respect to the road surface 870 on which the vehicle 100 is travelling, improved depth is provided for short range imaging. In one depicted embodiment, the first plane 802 represents a top edge of the field of view, and the second plane 804 represents a bottom edge of the depth of field (back) 838, with vertical angle of view (AOV) 830 therebetween. As shown in FIG. 8, the sharpest focal plane 850 is between the first and second planes 802, 804, and parallel to the first plane 802.

Also in the embodiment of FIG. 8, and in contrast to the configuration of FIG. 3, the focal plane (or sharpest focal plane) 850 is not parallel to the road surface 870 and is not parallel to the image sensor plane 104 and lens plane (105), but rather is angled with respect to the road surface 870. In various embodiments, the angle made between the sharpest focal plane 850 and the road surface 870 is in the range of zero to eighty degrees. Also in the depicted embodiment, the depth of field region is adjusted to ensure a distance "L" 890 (in one embodiment, a distance of at least five to ten meters) on the road surface 870 is within an acceptably sharp focus. Also in the depicted embodiment, this application results in a larger region of sharp focus near the road surface 870 while achieving a similar camera angle of view. With respect to FIGS. 7 and 8, in certain embodiments the focal plane is tilted to intersect with the image and lens planes, resulting in a larger region of sharp focus near the road surface.

Figure 9:
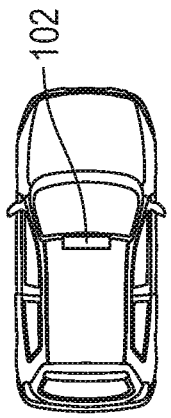

Next, with respect to FIG. 9, a second vehicle application is provided for a forward vision camera system, in accordance with an exemplary embodiment. In various embodiments, the vehicle application of FIG. 9 is utilized in connection with one or more camera-based active safety technologies (e.g., lane assist, adaptive cruise control, forward collision art, automatic emergency braking, and front pedestrian braking) for the vehicle 100 of FIG. 1.

As shown in FIG. 9, in the depicted embodiment, one or more cameras 102 are mounted near a front of the vehicle 100. In one embodiment, a camera 102 is mounted behind a front windshield of the vehicle 100. The application of FIG. 9 is described in greater detail below in connection with different exemplary implementations in FIGS. 10-12 below.

Figure 10:
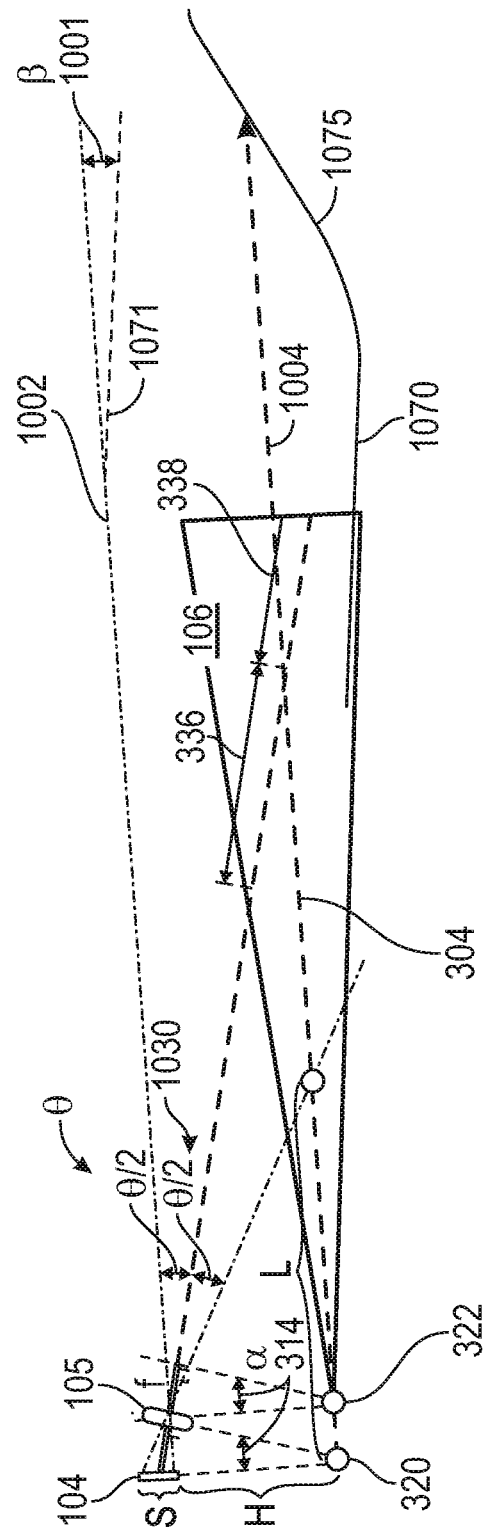

Specifically, with reference to FIG. 10, a first configuration for a camera 102 for the forward vision camera system of FIG. 9 is provided, in accordance with an exemplary embodiment. In the embodiment of FIG. 10, the same sensor 104 and lens 105 assembly is provided as described above in connection with FIG. 3, and including the same angle α 314.

In the depicted embodiment, the entire camera 102 of the embodiment of FIG. 3 (including the sensor 104 and lens 105 layout) is angled to improve the capability to handle road topography changes. Specifically, in the depicted embodiment, the focal plane 1004 is parallel to the first plane 1002, and the first plane 1002 makes an angle β 1001 with a plane 1071 that is parallel to the road surface 1070.

In certain embodiments, the maximum value for the angle β 1001 is twenty degrees, so that the camera 102 will not lose the capability to receive a far enough depth of field, even with a slope 1075 in the road surface 1070. In the depicted embodiment, the camera 102 still maintains a theoretically infinite depth. In addition, the road surface 1070 is covered in the camera field of depth region by determining the camera 102 f-stop. Also in various embodiments, the value for the vertical angle of view (AOV) θ 1030 is greater than thirty degrees; and the value of the angle β 1001 is between five degrees and twenty degrees.

Figure 11:
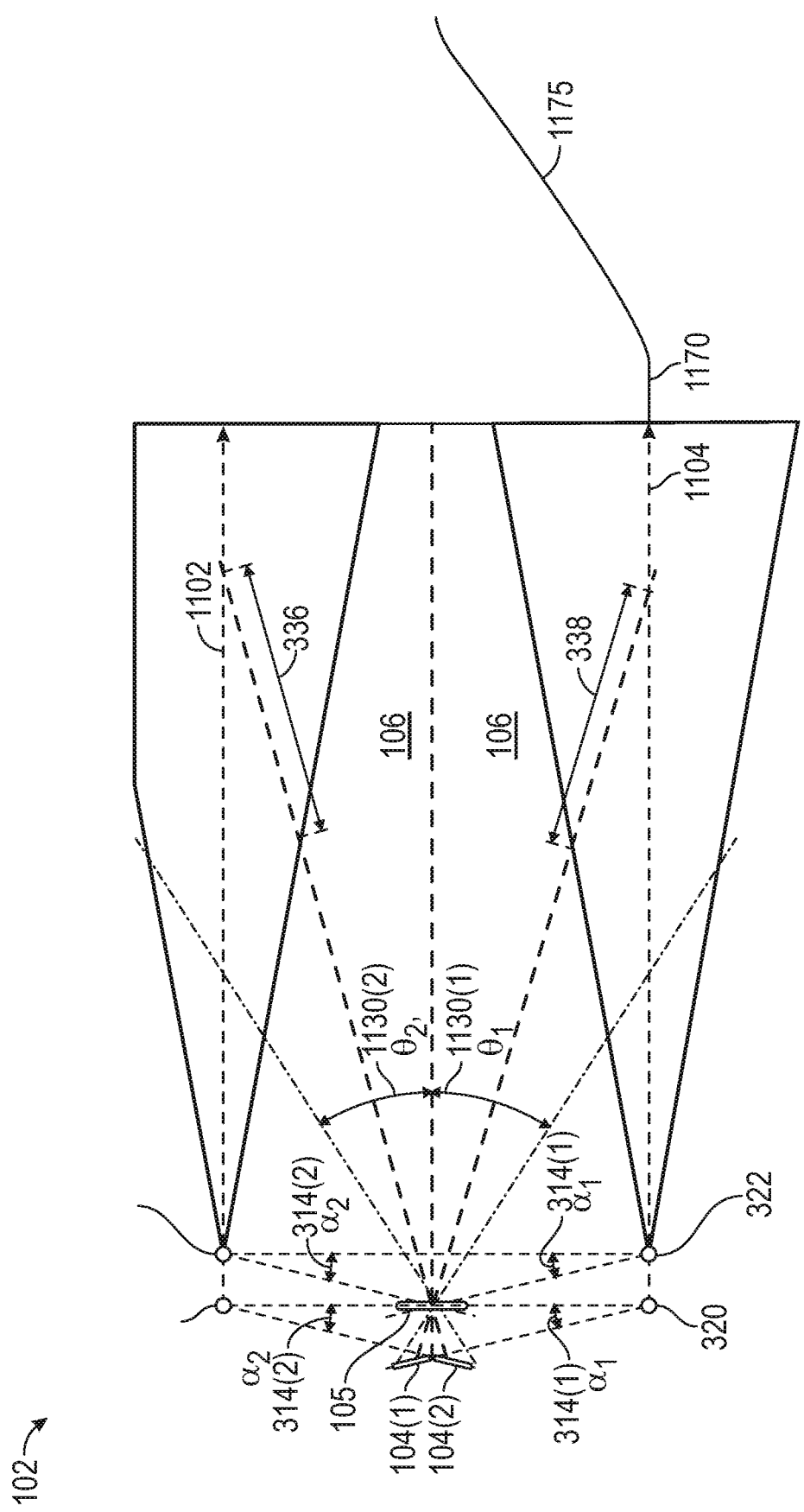

Next, with reference to FIG. 11, a second configuration for a camera 102 for the forward vision camera system of FIG. 9 is provided, in accordance with an exemplary embodiment. In the embodiment of FIG. 11, the same sensor 104 and lens 105 assembly is provided as described above in connection with FIG. 4, including the use of two sensors 104(1) and 104(2) with a single lens assembly 105, and including the same anglers $α_1$ 414(1) and $α_2$ 414(2). The use of two sensors creates two focal planes (1102 and 1104).

In the depicted embodiment of FIG. 11, the camera 102 is mounted such that the focal planes 1102 and 1104 are parallel to the road surface 1170 and vehicle movement direction. The focal plane direction in FIG. 11 provides for an infinite depth of view, while the use of two sensors with one lens assembly provides a camera field of view that covers the entirety of the road surface 1170 in the direction of vehicle movement, including for changes in topography such as a slope 1175 of the roadway 1170. In various embodiments, the combined vertical angle of view (AOV) θ 1130 of greater than forty degrees, with each of the first and second component angles of view $θ_1$ 1130(1) and $θ_2$ 1130(2) depicted in FIG. 11 each being greater than twenty degrees. Also in the depicted embodiment, the configuration thereby accounts for topography changes (e.g., including the slope 1175 in the road surface 1170), and still provides a theoretically infinite depth. In certain embodiments, the camera angle of view is greater than forty degrees. Similarly, in the embodiment of FIG. 11, the two sensors 104(1) and 104(2) can be separated with a reflection mirror as described above in connection with FIG. 5.

Figure 12:
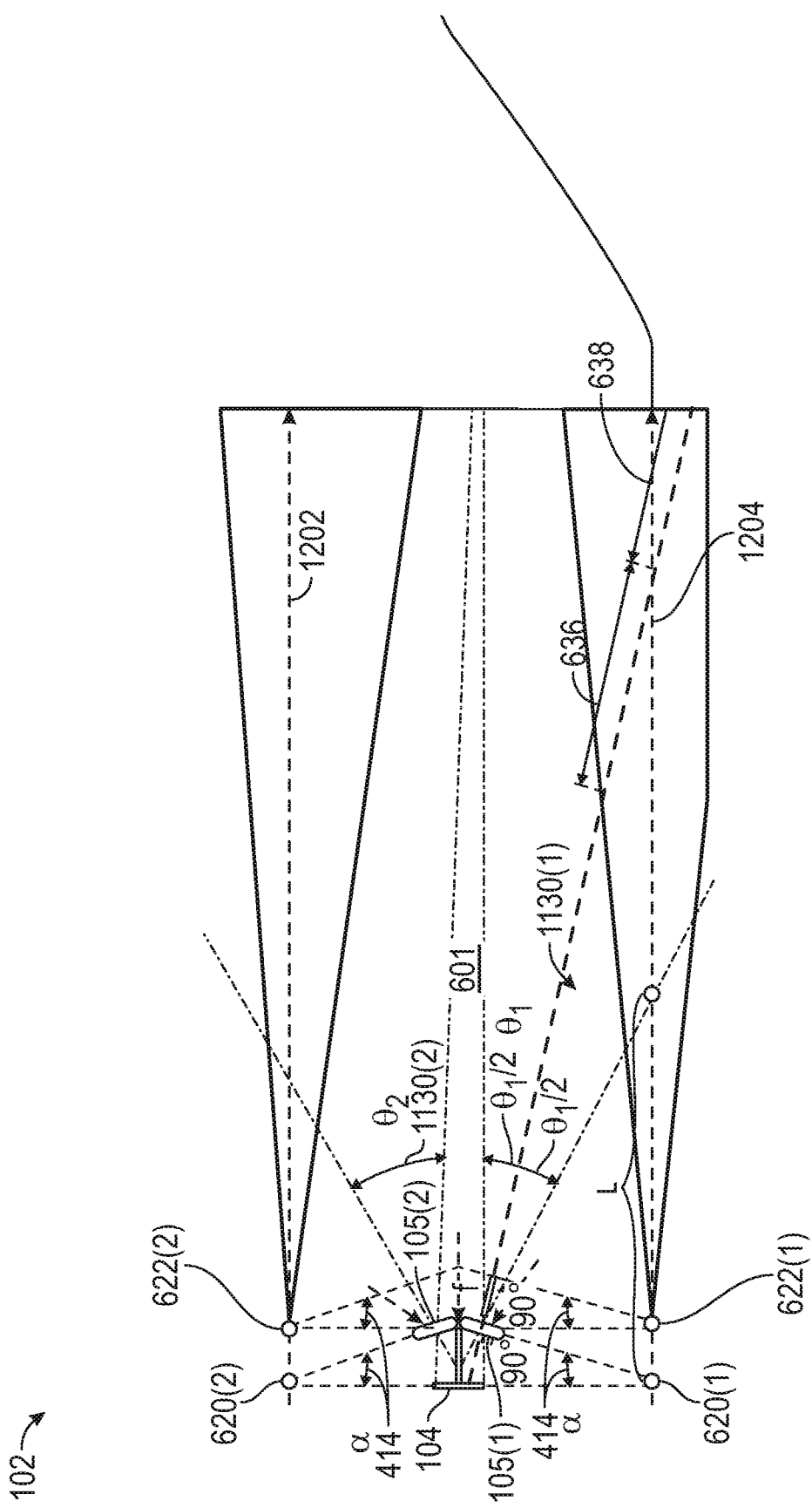

Next, with reference to FIG. 12, a third configuration for a camera 102 for the forward vision camera system of FIG. 9 is provided, in accordance with an exemplary embodiment. In the embodiment of FIG. 12, the same sensor 104 and lens 105 assembly is provided as described above in connection with FIG. 6, including the use of the single sensor 104, two lens assemblies 105(1) and 105(2), and the image separator 601, and including the same angles α 614. The use of two lens assemblies creates two focal planes (1202 and 1204).

In the depicted embodiment of FIG. 12, similar to the discussion above in connection with FIG. 11, the camera 102 is mounted such that the focal planes 1202 and 1204 are parallel to the road surface 1270, and provide an theoretically infinite depth of view and a large camera field of view that covers the entirety of the road surface 1270 in the vehicle movement direction, including for changes in topography such as a slope 1275 of the roadway 1270. In various embodiments, the combined vertical angle of view (AOV) θ 1230 of greater than forty degrees, with each of the first and second component angles of view $θ_1$ 1230(1) and $θ_2$ 1230(2) depicted in FIG. 12 each being greater than twenty degrees. Also in the depicted embodiment, the configuration thereby accounts for topography changes (e.g., including the slope 1275 in the road surface 1270), and still provides a theoretically infinite depth.

Figure 13:
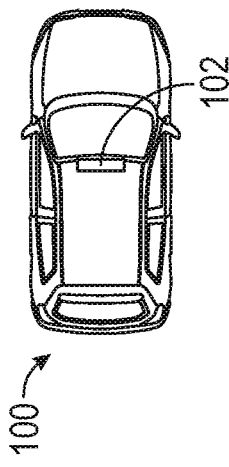

With respect to FIG. 13, a third vehicle application is provided for rear camera mirror's unobstructed vision for driver assistance, in accordance with an exemplary embodiment. In one embodiment, the vehicle application of FIG. 13 is utilized in connection with a rear camera vision functionality for the vehicle 100 of FIG. 1.

As shown in FIG. 13, in the depicted embodiment, a camera 102 is positioned on a rear side of the vehicle 100 (e.g., on or proximate a rear hatch, trunk, or rear body panel of the vehicle 100). Also as shown in FIG. 13, a rear camera mirror 1301 is installed in the vehicle 100, for example on a rearview mirror of the vehicle 100. In various embodiments, camera configurations as set forth in FIGS. 10-12 may be utilized for this application of FIG. 13. In various embodiments, the sensor(s) 104 and lens(es) 105 are configured such that the angle β 1001 and/or the double angle of views $θ_1$ 11301(1) and $θ_2$ 1130(2) of FIG. 11 and/or the angle of views $θ_1$ 12301(1) and $θ_2$ 1230(2) of FIG. 12 are provided to better improve the customer experience, regardless of any changes in road topography, for providing a convenient view of the vehicle 100's rear surroundings, via the images captured on the rear camera 102, via a display on the rear camera mirror 1301 of FIG. 13.

Figure 14:
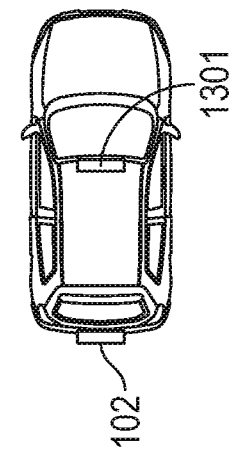

Next, with respect to FIG. 14, a fourth vehicle application is provided for a forward vision camera system used for autonomous driving, in accordance with an exemplary embodiment. As shown in FIG. 14, in the depicted embodiment, a single camera 102 is utilized, near a front of the vehicle 100. In one embodiment, the camera 102 is mounted behind a front windshield of the vehicle 100. The application of FIG. 14 is described in greater detail below in connection with different exemplary implementations in FIGS. 15-18 below.

Figure 15:
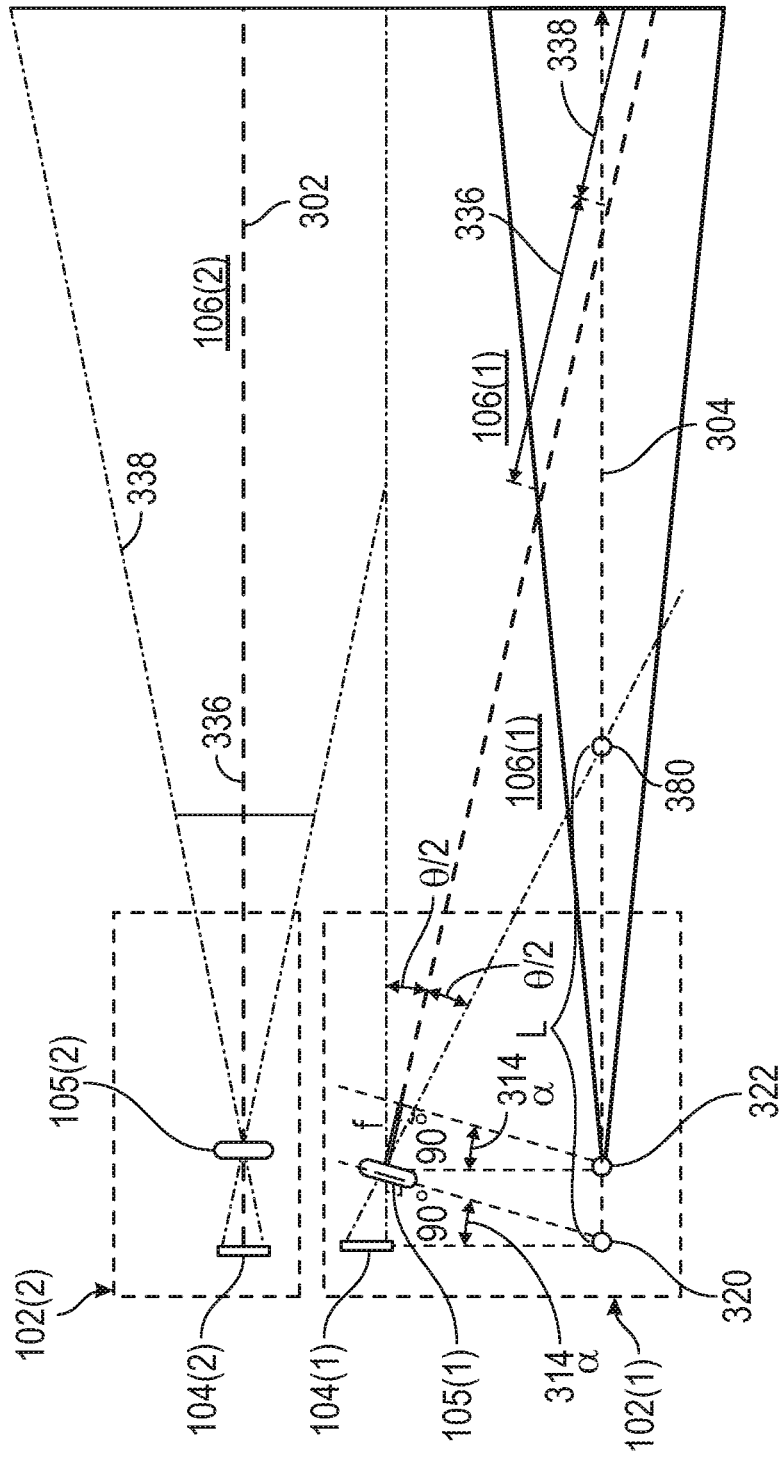

Specifically, with reference to FIG. 15, a first configuration for camera 102 for the camera system of FIG. 14 is provided, in accordance with an exemplary embodiment. In the embodiment of FIG. 15, two cameras 102 are utilized; namely, a first camera 102(1) and a second camera 102(2).

As depicted in FIG. 15, the first camera 102(1) includes a single sensor 104(1) and a single lens assembly 105. In this embodiment, the sensor 104(1) and the lens assembly 105 of the first camera 102(1) are configured in a manner similar to FIG. 3, with the same angle α 314, and generating a horizontal field of view 106(1) similar to FIG. 3. Also as depicted in FIG. 15, the second camera 102(2) comprises a conventional camera, in which the sensor 104(2) and lens 105(2) are parallel to one another, thereby generating a vertical field of view 106(2). In the embodiment of FIG. 15, the combined fields of view 106(1) and 106(2), together, achieve a long enough depth for camera to detect vehicles and pedestrians in a significant distance away (e.g., as far as two hundred meters, in one embodiment), and also enable a large vertical angle of view to handle road topography changes and to detect traffic light phases. Also in the depicted embodiment, the combined vertical angle of view (from components 1700(1) and 1700(2) that is greater than forty degrees with a theoretically infinite depth.

Figure 16:
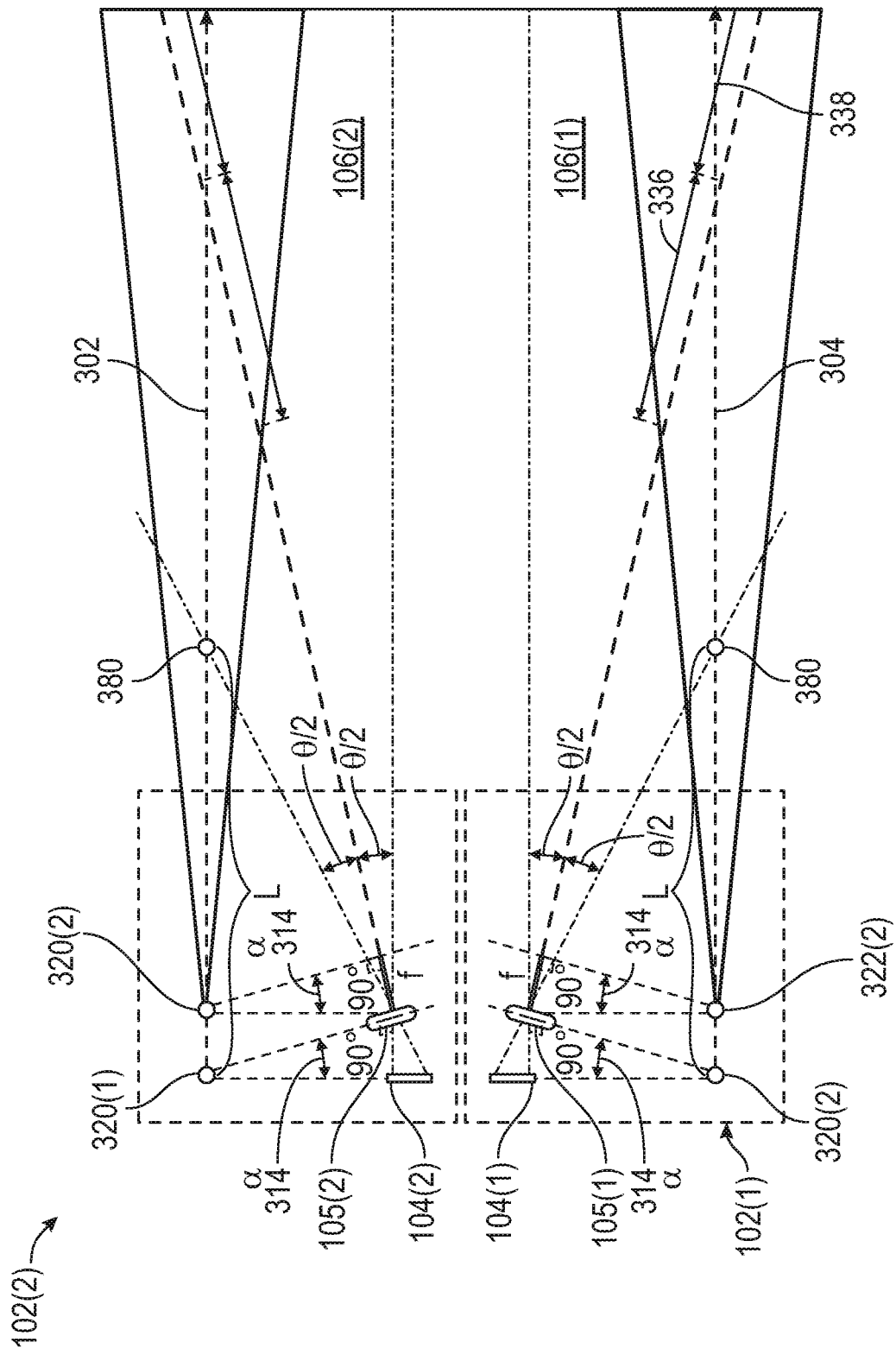

Next, with reference to FIG. 16, a second configuration for camera 102 for the camera system of FIG. 14 is provided, in accordance with an exemplary embodiment. In the embodiment of FIG. 16, two cameras 102 are utilized; namely, a first camera 102(1) and a second camera 102(2).

As depicted in FIG. 16, the first camera 102(1) includes a single sensor 104(1) and a single lens 105. In this embodiment, the sensor 104(1) and the lens assembly 105 of the first camera 102(1) are configured in a manner similar to FIG. 3, with the same angle α 314, and generating a horizontal field of view 106(1) similar to FIG. 3. Also as depicted in FIG. 16, the sensor 104(1) and the lens assembly 105 of the second camera 102(1) are also configured in a manner similar to FIG. 3, with the same angle α 314, and generating a horizontal depth of field 106(1) similar to FIG. 3 the second camera 102(2) also. In the embodiment of FIG. 16, the combined fields of view 106(1) and 106(2), together, also achieve a long enough depth for the field of view to detect vehicles and pedestrians a significant distance away (e.g., as far as two hundred meters, in one embodiment), and also enable a large vertical angle of view to handle road topography changes and to detect traffic light phases.

Figure 17:
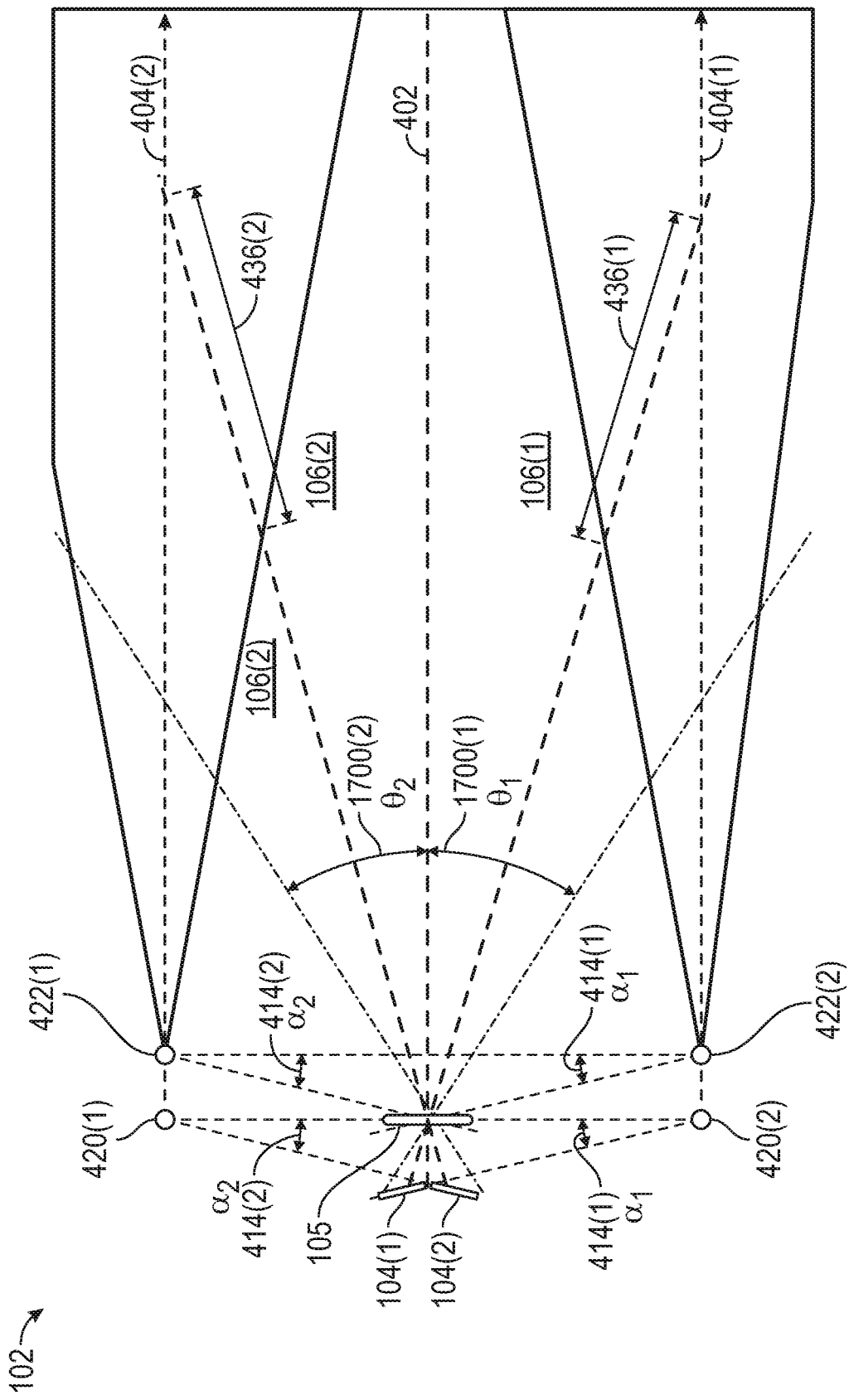

Next, with reference to FIG. 17, a third configuration for a camera 102 for the camera system of FIG. 14 is provided, in accordance with an exemplary embodiment. In the embodiment of FIG. 17, a single camera 102 is utilized.

As depicted in FIG. 17, the camera 102 includes two sensors 104(1) and 104(2), and a single lens 105. In this embodiment, the sensors 104(1), 104(2) and the lens 105 of the camera 102 are configured in a manner similar to FIG. 4, with the same angles $α_1$ 314(1) and $α_2$ 314(2), and generating horizontal depth of fields 106(1) and 106(2) similar to FIG. 4. In the embodiment of FIG. 17, the combined fields of view 106(1) and 106(2), together, provide a significantly increased field of view to handle road density changes and to detect traffic light phases. In the depicted embodiment, the combined vertical angle of view is greater than forty degrees (from combining components $θ_1$ 1700(1) and $θ_2$ 1700(2), each of which are greater than twenty degrees), for example in order to handle roadway topography changes, and the camera 102 also provides a theoretically infinity depth. Also in various embodiments, the camera 102 is tilted to form an angle between zero and twenty degrees between the focal plane and the road surface to handle road topography changes. Similarly, in the embodiment of FIG. 17, the two sensors 104(1) and 104(2) can be separated with a reflection mirror as described above in connection with FIG. 5.

Figure 18:
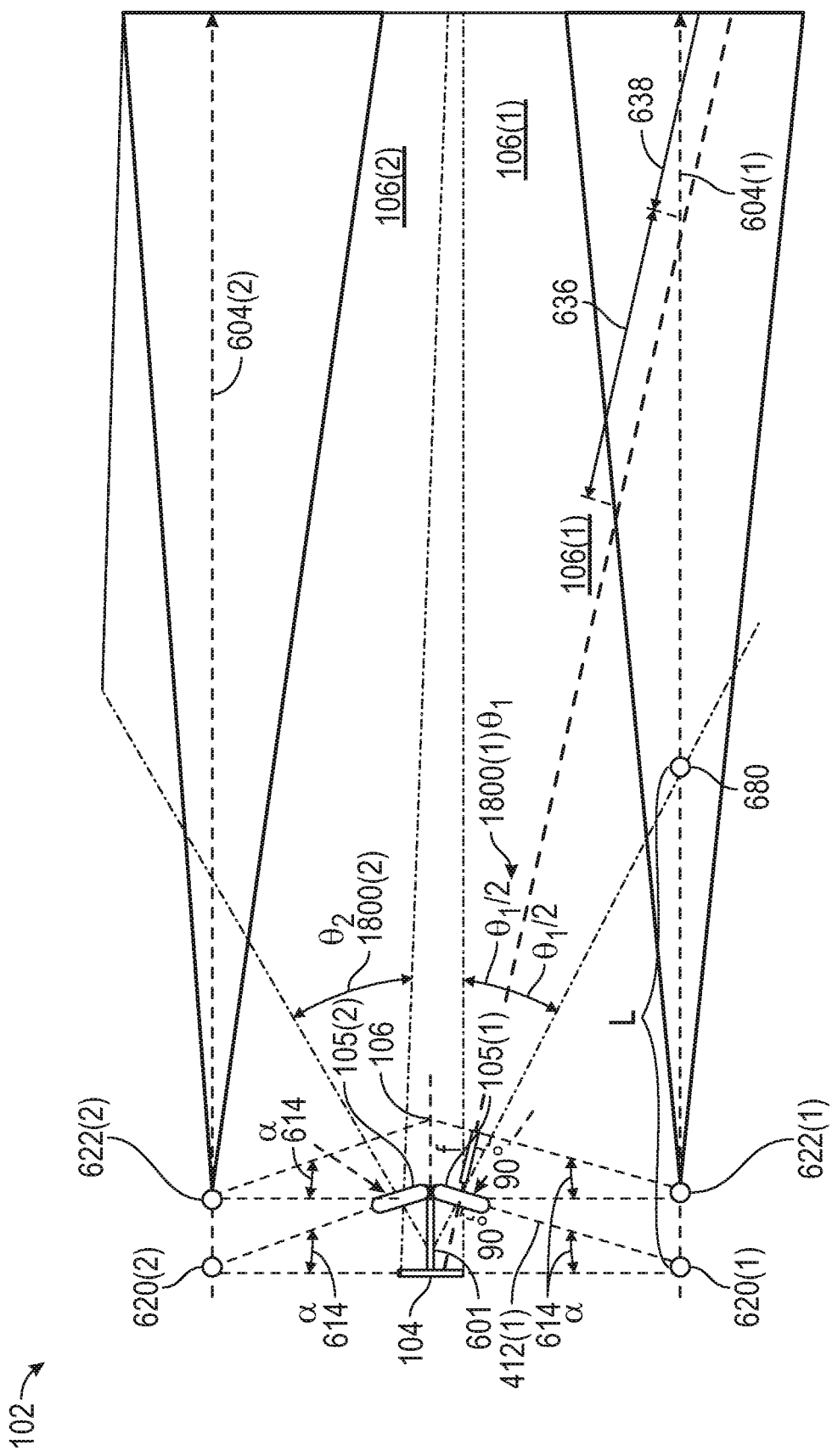

Finally, with reference to FIG. 18, a fourth configuration for a camera 102 for the camera system of FIG. 14 is provided, in accordance with an exemplary embodiment. In the embodiment of FIG. 18, a single camera 102 is utilized.

As depicted in FIG. 18, the camera 102 includes a single sensor 104 and two lenses 105(1) and 105(2), along with an image separator 106. In various embodiments, the image separator 106 extends from the sensor between the first lens and the second lens. In this embodiment, the sensor 104, the lenses 105(1) and 105(2), and the image separator 106 of the camera 102 are configured in a manner similar to FIG. 6, with the same angles α 614, and generating horizontal depth of fields 106(1) and 106(2) similar to FIG. 6. In the embodiment of FIG. 18, the combined fields of view 106(1) and 106(2), together, provide a significantly increased field of view to handle road density changes and to detect traffic light phases. In the depicted embodiment, the combined vertical angle of view is greater than forty degrees (from combining components $θ_1$ 1800(1) and $θ_2$ 1800(2), each of which are greater than twenty degrees), for example in order to handle roadway topography changes, and the camera 102 also provides a theoretically infinity depth. Also in various embodiments, the camera 102 is tilted to form an angle between zero and twenty degrees between the focal plane and the road surface to handle road topography changes.

Accordingly, the disclosed methods, systems, and vehicles provide for an improved field of view and depth of field for cameras of vehicles. In various embodiment, the depth of field (and focal plane) is aligned parallel to a horizontal movement direction of the vehicle, thereby providing a greater depth of field of sharp clarity for the camera images as the vehicle travels along the roadway. In various embodiment, two image sensors, two lens assemblies, or two cameras are provided to significantly increase field of view to handle road to road topography changes. Also in various embodiments, a number of exemplary embodiments are provided to accomplish these features, including with varying numbers and positioning of sensors, lenses, lens assemblies, mirrors, and/or image separators for the cameras. In addition, in various embodiments, a number of different vehicle applications and implementations are also provided, utilizing the different embodiments for single cameras as well as for multiple cameras of different types for the vehicle.

It will be appreciated that the systems, vehicles, applications, and implementations may vary from those depicted in the Figures and described herein. For example, in various embodiments, the vehicle 100, camera(s) 102, control system 120, and/or other systems 130 of FIG. 1 may vary. In addition, also in various embodiments, the various embodiments, vehicle applications, and configurations of FIGS. 2-18 may also vary in different embodiments, among other possible variations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A camera configured for installation in a mobile platform, the camera comprising:
one or more image sensors; and
one or more lens assemblies configured with respect to the one or more image sensors, that at least one image plane from the one or more image sensors is tilted to form a non-zero angle with at least one equivalent lens plane from the one or more lens assemblies, transferring an image sensor focal plane to be parallel to the direction of movement for the mobile platform in which the camera is installed, providing a theoretically infinite depth of field for the image sensor,
wherein:
the one or more image sensors comprise:
a first image sensor having a first image plane; and
a second image sensor having a second image plane;
the one or more lens assemblies comprise a single lens assembly;
the lens plane forms a non-zero angle with both the first image plane and the second image plane; and
the use of multiple image sensors, namely, the first and second image sensors, increases the camera angle of view as compared with using a single image sensor.

2. The camera of claim 1, wherein:
the camera includes one or more focal planes; and
at least one focal plane makes a non-zero angle with respect to the image plane.

3. The camera of claim 2, wherein the focal plane intersects both the image plane and a lens plane at a single point.

4. The camera of claim 2, wherein the focal plane is aligned to be parallel to the horizontal direction of movement of the mobile platform.

5. The camera of claim 2, wherein the focal plane is parallel to an edge plane of the field of view.

6. The camera of claim 2, wherein the focal plane extends horizontally a theoretically infinite distance from the vehicle in the horizontal direction of movement of the vehicle.

7. The camera of claim 1, further comprising:
a mirror disposed to separate the second image sensor and the first image sensor.

8. A mobile platform comprising:
a body; and
a camera disposed on the body, the camera comprising:
one or more image sensors; and
one or more lens assemblies configured with respect to the one or more image sensors, that at least one image plane from the one or more image sensors is tilted to form a non-zero angle with at least one equivalent lens plane from the one or more lens assemblies, resulting in a field of view that is aligned parallel to a horizontal direction of movement of the mobile platform in which the camera is installed;
wherein:
the one or more image sensors comprise a single image sensor;
the one or more lens assemblies comprises:
a first lens assembly having a first lens plane; and
a second lens assembly having a second lens plane;
each of the first lens plane and the second lens plane forms a non-zero angle with the image plane;
the camera further includes an image separator extending from the image sensor between the first lens and the second lens; and
the use of multiple lens assemblies, namely, the first and second lens assemblies, increases the camera angle of view as compared with using a single lens assembly.

9. The mobile platform of claim 8, wherein:
the camera includes a focal plane; and
the focal plane makes a non-zero angle with respect to the image plane.

10. The mobile platform of claim 9, wherein the focal plane intersects both the image plane and the lens plane at a single point.

11. The mobile platform of claim 9, wherein the focal plane is aligned to be parallel to the horizontal direction of movement of the mobile platform.

12. The mobile platform of claim 9, wherein the focal plane is parallel to an edge plane of the field of view.

13. A camera configured for installation in a mobile platform, the camera comprising:
one or more image sensors; and
one or more lens assemblies configured with respect to the one or more image sensors, that at least one image plane from the one or more image sensors is tilted to form a non-zero angle with at least one equivalent lens plane from the one or more lens assemblies, transferring an image sensor focal plane to be parallel to the direction of movement for the mobile platform in which the camera is installed, providing a theoretically infinite depth of field for the image sensor;
wherein:
the one or more image sensors comprise a single image sensor;

the one or more lens assemblies comprises:
a first lens assembly having a first lens plane; and
a second lens assembly having a second lens plane;
each of the first lens plane and the second lens plane forms a non-zero angle with the image plane; and
the use of multiple lens assemblies, namely, the first and second lens assemblies, increases the camera angle of view as compared with using a single lens assembly.

14. The camera of claim 1, wherein:
the camera includes one or more focal planes; and
at least one focal plane makes a non-zero angle with respect to the image plane.

15. The camera of claim 14, wherein the focal plane intersects both the image plane and a lens plane at a single point.

16. The camera of claim 14, wherein the focal plane is aligned to be parallel to the horizontal direction of movement of the mobile platform.

17. The camera of claim 14, wherein the focal plane is parallel to an edge plane of the field of view.

18. The camera of claim 14, wherein the focal plane extends horizontally a theoretically infinite distance from the vehicle in the horizontal direction of movement of the vehicle.

19. The camera of claim 13, further comprising:
an image separator extending from the image sensor between the first lens and the second lens.

* * * * *